3,531,563
**UREA PARTICLES COATED WITH
TETRACYCLINE ANTIBIOTICS**
Irving Klothen, Princeton, and Armin Wolfgang Brahm, Robbinsville, N.J., assignors to American Cyanamid Company, Stamford, Conn., a corporation of Maine
No Drawing. Filed Aug. 16, 1967, Ser. No. 660,923
Int. Cl. A23k 1/17, 1/22
U.S. Cl. 424—21                                9 Claims

ABSTRACT OF THE DISCLOSURE

The invention relates to the preparation of free-flowing compositions of urea and a tetracycline antibiotic for use in feeding ruminant animals. The invention provides antibiotic-stable, free-flowing compositions for feeding ruminant animals composed of discrete, free-flowing particles containing an inner core of urea, coated with a protective fatty substance, which is, in turn, coated with a tetracycline antibiotic.

---

Generally stated, the subject matter of the present invention relates to novel free-flowing compositions of urea with a tetracycline-type antibiotic, a method of preparing same and the use of such compositions for feeding ruminant animals. More particularly, the invention relates to a novel, antibiotic-stable, free-flowing composition for feeding ruminant animals and a method of preparing same, comprising urea particles coated with a tetracycline-type antibiotic.

In recent years the use of antibiotics in animal feeds for improving growth characteristics and efficiency of feed utilization has become of considerable economic importance. One of the best of such procedures is described in the United States patent to Jukes No. 2,619,420 which involves the addition to animal feeds of the antibiotics produced by fermentation of an aqueous nutrient medium with the microorganism *Streptomyces aureofaciens*. In practice, the fermentation mash solids are harvested, after the fermentation has been continued for the requisite length of time, and dried. The dried harvest mash solids containing the antibiotic, usually chlortetracycline, can be used as an animal feed supplement or the solids may be blended with conventional animal feed materials to produce a nutritionally-balanced growth-accelerating animal feed.

In addition, the benefits obtained with the incorporation of urea in animal feeds is also well known. See, for example, U.S. Pat. Nos. 2,569,282, 2,560,830, 2,748,001, 2,903,355 and 2,958,600 which describe a variety of animal feeds and animal feed supplement which contain urea in various forms of admixture. The use of these materials in animal feeds is not, therefore, surprising or unheard of. Nevertheless, the incorporation of each of these materials in feeds presents its own problems. For example, it is known that the potency of tetracycline-type antibiotics is generally rapidly lost when the antibiotic comes in contact with moisture and/or alkaline conditions. It is also recognized that urea is a very hygroscopic material and as such tends to absorb moisture on standing, is subject to caking problems, and is difficult to distribute uniformly in feeds. Therefore, in view of the nature of the aforementioned materials and the particular problems they present, it is very surprising and altogether unexpected that urea, a hygroscopic material which can be alkali-producing when it breaks down and forms ammonia, can be coated with a tetracycline antibiotic to form a very useful and desirable product; namely, a free-flowing, potency stable tetracycline composition with urea which lends itself to uniform distribution in animal feeds and largely avoids the problems encountered with each material when used alone or admixed separately in feeds.

Among the forms of urea which are amenable to use in the compositions of the present invention are particles, crystals, micro prills and the like. Typically, urea particles having a mesh size between about 5 and 100 mesh are satisfactory; however, those having a major portion of particles, crystals, or prills between about 20 and 60 mesh are preferred.

Any of the commercially available and commonly used tetracycline antibiotics, such as chlortetracycline, tetracycline, oxytetracycline, 6 - methylene-5-hydroxy-tetracycline, 6-demethyl - 7 - chlortetracycline, 6-demethylchlortetracycline and the like may be used. Chlortetracycline, however, is preferred because of its already wide acceptance as an animal feed additive of choice and is more effective than some of the other tetracycline antibiotics. Also included within the scope of the present invention are the dried fermentation mashes containing the crude tetracycline-type antibiotic, as well as salts, and metal complexes of such antibiotics. Such salts and metal complexes include the hydrochloride salts, amino acid complex salts, calcium aluminum gluconate and the like in crude or refined form.

In order to prepare the discrete free-flowing, antibiotic-stable particles of the invention, the antibiotic employed for the coating on the urea must be finely divided (i.e., not larger than about 40 mesh and preferably containing a major portion of particles smaller than about 60 mesh).

It has been found that spray dried fermentation mash, milled dried fermentation cake, and spray dried fermentation filtrate or mixtures of these materials derived from the fermentation of microorganisms *Streptomyces aureofaciens* or *Streptomyces rimosus* in a nutrient broth are particularly well adapted for use in coating particulate urea. These materials may contain the unrefined tetracycline antibiotic, as well as mycelium, proteinaceous insolubles, vitamin $B_{12}$, filter aid and other insolubles or condensed solubles from the fermentation, and provide a convenient ready source of antibiotically active material without the necessity of refining or extracting the antibiotic from the mash.

Furthermore, it has been found that where the above-mentioned crude dried fermentation products furnish less than the desired amount of tetracycline antibiotic (i.e., about 70 milligrams to 22,000 milligrams of tetracycline per pound of urea) crystalline tetracycline antibiotics as hereinbefore specified may be admixed with the dried fermentation mash to supplement the antibiotic content thereof. However, it is important when preparing the admixture of crude and crystalline antibiotics to employ crystalline antibiotics of essentially the same mesh size as the crude products. Similarly, vitamins, antioxidants and estrogenic hormones may be admixed with the coating materials and applied to the urea particles without deleterious effects either with respect to the free-flowing characteristics of the coated particles or the stability of the antibiotic.

We have found that the antibiotic-stable, free-flowing products of this invention can only be satisfactorily prepared when the urea is first coated with an oil, fat or fatty substance essentially inert with respect to both the urea and the tetracycline antibiotic. Among the substances which have been found useful in the preparation of the compositions of the present invention, are methylated coconut oil fractions, animal and vegetable fats, fatty acids, acetylated glycerides and monoglycerides of edible fats. In the practice of the present invention, it is preferable to employ the latter named materials; that is, the acetylated glycerides. They may, of course, be partially or fully acetylated.

The advantages of the compositions of this invention are several. In addition to furnishnig the nitrogen required by ruminants for conversion to animal protein and providing the antibiotic which stimulates animal growth and protects them from bacterial infections, the present invention provides a urea composition essentially free of caking problems. It eliminates or reduces the need for coating the urea with clay or other inert materials which are of no value to the animal and simply incur additional expense; it assures a constant ratio of tetracycline antibiotic to urea in all portions of the feed with which it is admixed; and it provides excellent distribution of the antibiotic in the feed. Furthermore, use of these compositions frequently eliminates one blending operation from previous feed mill practice. When it is recognized that considerably less than one pound of dried fermentation cake is normally all that is required to supply the recommended level of antibiotic in one ton of cattle feed, the magnitude of the problem of uniformly distributing this quantity in the same mass is apparent.

The following examples are provided for illustrative purposes and may include particular features of the invention, however, this should not be construed as limiting the invention, many variations of which are possible without departing from the spirit or scope thereof.

EXAMPLE I 5000 grams of heated urea prills (i.e., about 50° C.) having a mesh size between about 10 and 100 mesh were placed in a rotating drum and sprayed with hot hydrolyzed fat, i.e., about 60° C.–90° C., (vegetable oil containing unsaturated fatty acid). 99.5 grams of a mixture of dried fermentation cake and acid washed spent cake derived from the fermentation of the microorganism *Streptomyces aureofaciens* and having a particle size not larger than 40 mesh were admixed with the fat-treated urea prills. Agitation of the mixture was continued until the prills appeared to be uniformly coated. The mixture was permitted to cool and samples therefrom were assayed microbiologically to determine the amount of chlorotetracycline present. The coated prills analyzed 181 milligrams chlortetracycline per pound of mixture. The prepared mixture was then placed in containers and stored at room temperature. At intervals of 2, 3, 6 and 12 months samples of the prepared mixtures were taken ond analyzed by the same standard microbiological assay method previously used. The results are provided in Table 1 below.

TABLE 1

| Months: | Recent recovery of chlorotetracycline |
|---|---|
| 2 | 95 |
| 3 | 97 |
| 6 | 91 |
| 12 | 88 |

Over the twelve-month period, the product was found to be free-flowing when stored in open and closed containers. No caking or segregation of the coating material from the urea prills was observed.

EXAMPLE II 5000 grams of urea prills comprising 75% by weight of —20/+60 mesh material were heated to about 50° C., placed in a blender, and sprayed with hot hydrolyzed fat. 9.5 grams of dried fermentation cake as in Example I were milled to 40 mesh size and 90 grams of a finely ground hydrated aluminum silicate, were blended with the fat-treated urea until uniform coating of the mixture was observed on the urea prills. The prepared material was then microbiologically analyzed and found to contain approximately 122 milligrams per pound of chlorotetracycline. The prepared samples were then stored at room temperature and one sample at 37° C. Samples stored at room temperature were assayed after 2, 3, 6 and 12 months showing 91, 94, 76, and 75% recovery of the chlorotetracycline, respectively. The sample stored at 37° C. was assayed and 85% of the chlortetracycline was recovered after one months.

EXAMPLE III

In the following tests urea micro prills, comprising about 75% —20/+60 mesh prills, were sprayed with Myvacet® 9–40, an essentially fully acetylated monoglyceride derived from prime lard. This mixture was then blended with —80 mesh dried fermentation cake obtained from the fermentation of *Streptomyces aureofaciens*. One sample was prepared using 454 grams of urea, 2.25 grams of the acetylated monoglyceride, and 6.35 grams of the milled dried fermentation cake. The second sample was prepared with 454 grams of urea, 1.12 grams of acetylated monoglyceride, an d 6.35 grams of the dried fermentation cake. Both samples were assayed and found to contain 510 milligrams of chlorotetracycline per pound of product. The samples were then stored at room temperautre for 2 and 4 month periods. After 2 months, 97% of the chlortetracycline was recovered and after 4 months, 100% was recovered. Sample No. 1 containing the 2.25 grams of acetylated monoglyceride was slightly wet. The product containing 1.12 grams of the acetyloted monoglyceride was free-flowing. Addition of 1.35 grams of finely divided hydrated aluminum silicate to the first sample yielded a free-flowing dry product which was free of segregation problems. Substitution of dried spent fermentation cake for the hydrated aluminum silicate yields an equally free-flowing nonsegregating product. Substituting a vegetable fat derived acetylated monoglyceride for the above-mentioned animal-type monoglyceride results in a product of similar characteristics.

800 pounds of micro prilled urea having a major portion of —20/+60 mesh prills were sprayed with 4 pounds of hot Stepan C–65, crude coconut oil methyl ester. One pound of —40 mesh dried fermentation cake obtained from the fermentation of *Streptomyces aureofaciens* was blended with the oil-treated prills to uniformity. The prepared material was stored in open bins and open and sealed paper bags and stored in non-air-conditioned storage areas. Separate samples in sealed glass containers for stability studies were stored either at room temperature (23° C.) or at 37° C. As a control, 800 grams of the urea micro prills were placed in a blender and admixed with one gram of the milled fermentation cake and 15 grams of ground kaolin. The control sample was then placed in moisture proof glass bottles and stored under the same conditions as the test samples. After 1 and 4 months at room temperature, the compositions prepared in accordance with the invention were assayed and found to retain 100% and 87% activity, respectively, whereas the control sample retained only 77% and 70% activity, respectively. Similarly, the samples prepared in accordance with the invention and stored at 37° C. for 2 months had 70% of the original activity whereas in the control sample only 61% of the chlorotetracycline was recovered. The compositions prepared in accordance with the invention and stored in open or closed bins or bags remained free-flowing and showed no signs of bridging or caking over a period of one year. Said samples were also found to be free of segregation problems whereas the controls were found to cake and segregate.

EXAMPLE V

Two 1000-gram samples of urea micro prills were sprayed with 5 grams of crude coconut oil methyl ester. One sample was then admixed with 2 grams of spray dried chlortetracycline mash obtained from the fermentation of *Streptomyces aureofaciens* and 18 grams of milled spent acid cake also obtained from the above-mentioned fermentation. Both materials had been milled to —40 mesh particle size.

The second sample was treated with 2 grams of the same spray dried chlortetracycline mash but 18 grams of finely divided kaolin were substituted for the spent cake.

Each sample was thoroughly mixed to provide uniform coating of the urea prills.

A control sample was also prepared using 100 grams of the above-mentioned urea prills and 2 grams of the spray dried mash. No oil was used and very poor coating of the prills was observed.

The samples were then placed in closed containers and placed in controlled temperature cabinet set for 23° C. and 37° C. following a microbiological assay for chlortetracycline present in said samples. After two months storage at 37° C., the samples were removed from the cabinet, examined, and again assayed microbiologically. Segregation of urea and spray dried mash in the control sample was observed along with a strong ammonia odor. Both test samples were found to be free-flowing, non-caking, uniform in color, and no odor was apparent. All samples, including the control, were assayed for chlortetracycline. The control sample showed only 56% recovery whereas the sample containing spent acid cake was found to contain 83% of the original chlortetracycline and the sample containing kaolin was found to have 70% of the chlortetracycline originally present.

EXAMPLE VI

As demonstrated below, the compositions of the subject invention may be prepared using dried fermentation mash obtained from the fermentation of *Streptomyces rimosus* as well as from *Streptomyces aureofaciens*. Additionally, it is hereafter established that estrogenic hormones and vitamins may be incorporated in coatings applied to the urea without detrimental effect.

In the following tests 75% —20/+60 mesh urea micro prills were sprayed with an acetylated monoglyceride or a mixture of acetylated monoglyceride, the methyl ester of crude coconut oil, and/or the vitamin E oil (tocopherol or tocopheryl acetate); then admixed with the ground dried fermentation cake alone or containing kaolin and/or diethylstilbestrol, vitamin A, and vitamin D. The samples thus prepared were assayed then stored at room temperature for 2 months in open containers. After storage, they were examined; all were observed to be non-caking, non-segregating, and free-flowing. Results of these tests are provided in table form below:

TABLE 2

| Antibiotic | Antibiotic initial assay, mg./lb. | Percent additive | Percent recovery [1] |
|---|---|---|---|
| Oxytetracycline | 755 | 98.1 urea<br>0.5 AMG [2]<br>1.4 OTC [3] | 88 |
| Do | 701 | 98.1 urea<br>0.25 AMG [2]<br>0.25 COME [4]<br>1.4 OTC [3] | 98 |
| Chlortetracycline | 477 | 98.65 urea<br>0.50 AMG [2]<br>1.35 CTC [5]<br>0.5 kaolin | 79 |
| Do | 584 | 98.64 urea<br>1.35 CTC [5]<br>0.044 DES [6]<br>0.5 kaolin<br>0.5 AMG [1] | 71 |
| Do | 506 | 98.80 urea<br>1.35 CTC [5]<br>1.85 vit. A and D<br>1.00 vit. E oil<br>2.5 kaolin | 101 |

[1] Based on initial assay (room temperature 2 months).
[2] Acetylated monoglyceride.
[3] Oxytetracycline.
[4] Coconut oil methyl ester.
[5] Chlortetracycline.
[6] Diethylstilbestrol.

EXAMPLE VII

Following the procedure of Example VI above 97.5% by weight of —20/+60 mesh urea microprills were sprayed with 0.5% by weight of an acetylated monoglyceride (Mryvacet 9–40 available from Distillation Products Industries, Rochester, N.Y.); then admixed with 1.5% by weight of the dried fermentation mash obtained from the fermentation of *Streptomyces aureofaciens*, 0.175% by weight of sulfamethazine and 0.325% by weight of kaolin.

For administration to ruminant animals such as cattle, the coated urea prills, thus prepared, are admixed with feed or used as a top dressing for the feed. Generally for cattle about 0.1 pound per head per day of the coated prills are administered. When admixed with the feed 10 pounds of coated prills per ton of feed provide the desired amount of supplement.

Although the invention has been described and illustrated by reference to particular embodiments thereof, it will be understood that in its broadest aspects the invention is not limited to such embodiments.

What is claimed:

1. A composition of matter comprising discrete, free-flowing particles containing an inner core of urea, said core being uniformly coated with a protective fat or oil which is essentially inert with respect to urea and tetracycline, which is, in turn coated with a finely-divided tetracycline antibiotic composition having a particle size not larger than about 40 mesh, said tetracycline antibiotic being present in amounts ranging from about 70 to about 22,000 milligrams per pound urea.

2. A composition according to claim 1, in which the tetracycline antibiotic is selected from the group consisting of chlortetracycline, tetracycline, oxytetracycline, demethyl chlortetracycline and 6-methylene-5-hydroxytetracycline.

3. A composition according to claim 1, wherein said discrete urea particles are between about 5 and 100 mesh size and said coating is a finely-divided tetracycline antibiotic composition selected from the group consisting of dried fermentation cake, dried fermentation mash, dried fermentation filtrate, and mixtures thereof derived from the fermentation of a microorganism selected from the group consisting of *Streptomyces aureofaciens* and *Streptomyces rimosus*.

4. A composition according to claim 2, wherein said finely divided tetracycline antibiotic composition contains in addition to said tetracycline antibiotic, materials selected from the group consisting of estrogenic substances, vitamins sulfonamides, antioxidants, and mixtures thereof, said substances having a particle size not larger than about 40 mesh.

5. A method of preparing the composition of claim 1, which comprises coating urea particles with a protective fatty substance, and coating the coated urea particles with a tetracycline antibiotic.

6. A composition according to claim 2, wherein said finely divided tetracycline antibiotic composition contains, in addition to said tetracycline antibiotic, sulfamethazine.

7. A composition according to claim 6, wherein the ratio of tetracycline antibiotic to sulfamethazine to urea is about between 70 and 2,000 milligrams of antibiotic and 70 to 22,000 milligrams of sulfamethazine per pound of urea.

8. Composition according to claim 7, wherein the tetracycline antibiotic is chlortetracycline.

9. A composition according to claim 4 wherein the particular fat or oil is present in amounts ranging from about 1120 to about 4580 milligrams per pound urea.

References Cited

UNITED STATES PATENTS

| 2,619,420 | 11/1952 | Jukes | 99—2 |
| 2,855,340 | 10/1958 | Kent et al. | 99—2 |
| 2,906,622 | 9/1959 | Lewis | 99—9 |
| 3,080,285 | 3/1963 | Odenwald et al. | 424—26 |

ALBERT T. MEYERS, Primary Examiner

D. M. STEPHENS, Assistant Examiner

U.S. Cl. X.R.

424—26, 227, 322; 99—2